(12) United States Patent
Tokarek

(10) Patent No.: US 9,121,264 B2
(45) Date of Patent: Sep. 1, 2015

(54) TOOL FOR TESTING DOWNHOLE TUBING

(76) Inventor: Wade Tokarek, Lloydminster (CA)

( * ) Notice: Subject to any disclaimer, the term of this patent is extended or adjusted under 35 U.S.C. 154(b) by 503 days.

(21) Appl. No.: 13/538,014

(22) Filed: Jun. 29, 2012

(65) Prior Publication Data

US 2013/0104643 A1    May 2, 2013

Related U.S. Application Data

(60) Provisional application No. 61/503,495, filed on Jun. 30, 2011.

(51) Int. Cl.
*E21B 47/10* (2012.01)
*E21B 47/00* (2012.01)

(52) U.S. Cl.
CPC .......... *E21B 47/1025* (2013.01); *E21B 47/0007* (2013.01)

(58) Field of Classification Search
CPC .................................................... E21B 47/1025
See application file for complete search history.

(56) References Cited

U.S. PATENT DOCUMENTS

| | | | | | |
|---|---|---|---|---|---|
| 2,955,458 | A | * | 10/1960 | Sonnier et al. | 73/40.5 R |
| 2,998,721 | A | * | 9/1961 | Gawlik | 73/49.1 |
| 3,338,312 | A | * | 8/1967 | Scott | 166/331 |
| 3,375,703 | A | * | 4/1968 | Phillips et al. | 73/40.5 R |
| 3,495,443 | A | * | 2/1970 | Switzer et al. | 73/40.5 R |
| 3,712,115 | A | * | 1/1973 | Miller | 73/49.1 |
| 3,800,596 | A | * | 4/1974 | Phillips et al. | 73/40.5 R |
| 3,921,437 | A | * | 11/1975 | Hauk | 73/40.5 R |
| 4,046,006 | A | * | 9/1977 | Dufrene | 73/152.51 |
| 4,081,990 | A | * | 4/1978 | Chatagnier | 73/40.5 R |
| 4,083,230 | A | * | 4/1978 | Rome et al. | 73/40.5 R |
| 4,474,055 | A | * | 10/1984 | Bergeron, Jr. | 73/49.5 |
| 4,548,069 | A | * | 10/1985 | Nousak | 73/49.5 |
| 5,883,303 | A | * | 3/1999 | Bliss et al. | 73/49.1 |
| 6,684,950 | B2 | * | 2/2004 | Patel | 166/250.01 |
| 2002/0121373 | A1 | * | 9/2002 | Patel | 166/250.08 |

OTHER PUBLICATIONS

Hydrotestors 2000 Ltd.—Pressure Testing. Hydrotesters Ltd. Available at http://www.hydrotestors.com/#/services/0 at least as early as 2010. First accessed Apr. 2012.

* cited by examiner

*Primary Examiner* — John Fitzgerald
(74) *Attorney, Agent, or Firm* — Davis & Bujold, P.L.L.C.; Michael J. Bujold

(57) ABSTRACT

A tool for testing a tubular has a shaft with a fluid passageway connecting a first port and one or more second ports. A sealing element seals against the tubular member. The shaft moves relative to the sealing sleeve between an open position in which the first port is in fluid communication with the second port and a closed position in which the sealing sleeve closes the first port. An anchor secures the sealing sleeve relative to the tubular member to permit the shaft to move from the open position to the closed position.

13 Claims, 3 Drawing Sheets

TOOL FOR TESTING DOWNHOLE TUBING

FIELD

This relates to a tool used to test downhole tubing, such as production tubing.

BACKGROUND

When production from a well driven by a pump slows, it is necessary to determine whether the production tubing is leaking, or whether the pump, such as a progressive cavity pump, is failing.

Typically, the tubing is tested by pulling the rods from the tubing and using an inspection truck to check the integrity of all the tubing joints. This process is slow as they can only pull so fast to get good readings, and weak joints have been missed even with this method. This process is relatively time consuming and expensive. Prior to this approach, the production tubing would be checked by pulling all the tubing and production pump from the well, then putting a plug and tubing drain on the bottom. The tubing would be run in ten joints at a time and pressure tested with water. If it did not fill, it would be pulled back up until the leak was located. The tubing would be run it ten joints at a time, and the few bad joints would be replaced. The drain plug was generally blown to speed up the re-pulling of the tubing string.

SUMMARY

There is provided a tool for testing a tubular member that has a shaft with a fluid passageway connecting at least one first port and at least one second port. A sealing element, which may be a sealing sleeve, seals against the tubular member. The shaft is movable relative to the sealing element between an open position in which the at least one first port is in fluid communication with the at least one second port and a closed position in which the sealing element closes the at least one first port. An anchor secures the sealing element relative to the tubular member to permit the shaft to move from the open position to the closed position.

In an aspect, the sealing element has an inner cavity. The shaft extends into the sealing element such that, in the closed position, the at least one first fluid port is positioned within the inner cavity.

In an aspect, the cavity has a first axial stop surrounding the shaft and the shaft has a second axial stop within the cavity. The second axial stop engages the first axial stop when in the open position. The shaft may also have a third axial stop positioned outside the inner cavity. The third axial stop engages the first axial stop when the shaft is in the closed position.

In an aspect, the anchor is released as the shaft is moved from the closed position to the open position.

In an aspect, when the shaft is in the open position, the at least one first port is open above the sealing element and the at least one second port is open below the sealing element.

There is provided a method of testing a tubular that includes the steps of providing a tool as described above. The tool is positioned in a tubular to be tested with the tool in the closed position such that the sealing element seals against the tubular. Fluid is pumped into the tubular above the tool with the fluid being retained above the tool by the sealing element. Retention of fluid within the tubular is observed to determine whether the tubular is defective. Once the test is complete, the shaft is moved to the open position to allow the fluid to drain from above the tool.

Other aspects will be apparent from the description and drawings.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
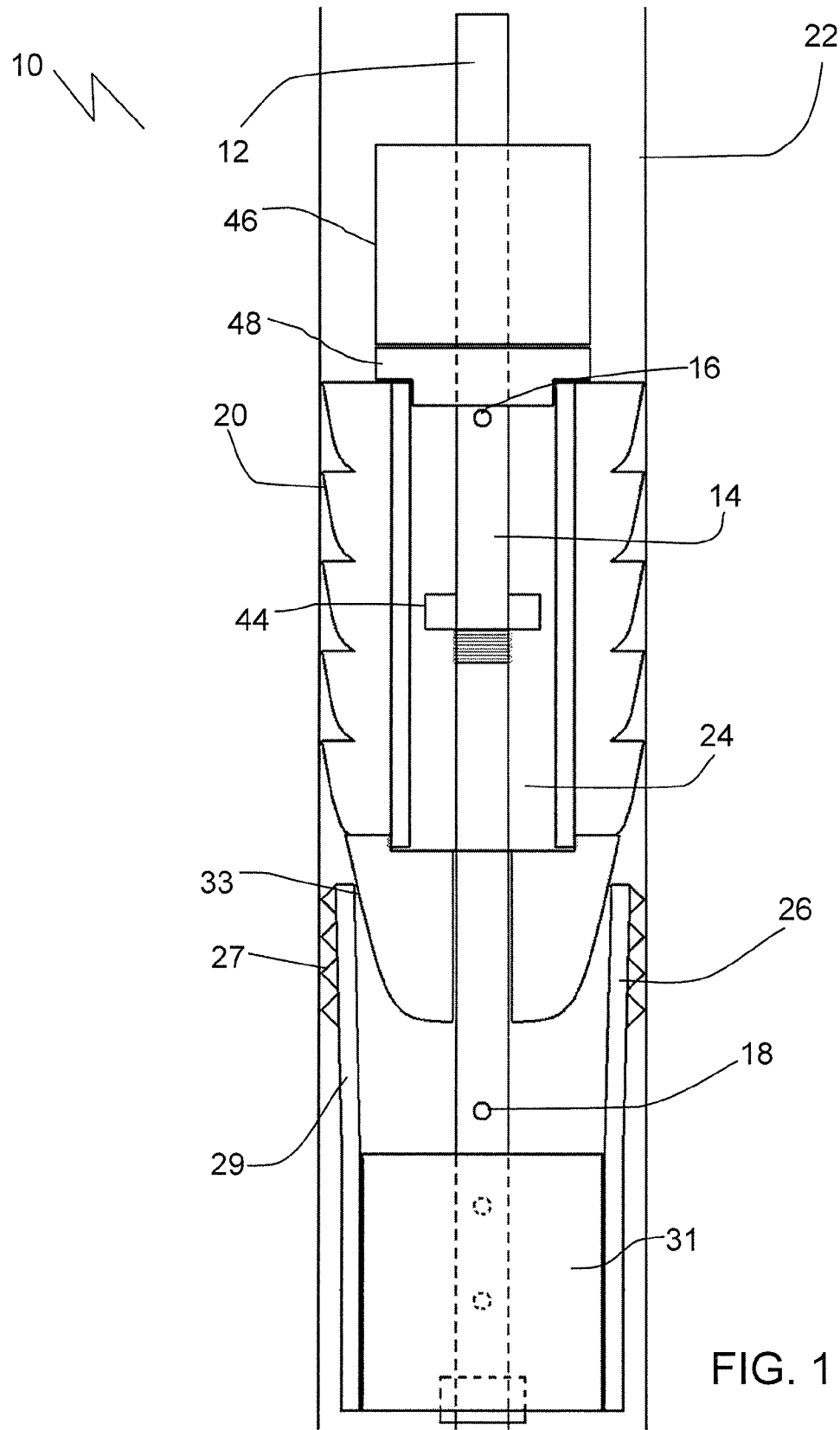
FIG. 1 is a front elevation view, in section, of a tool for testing a tubular member in the closed position.

A tool for testing downhole tubing generally identified by reference numeral 10, will now be described with reference to FIG. 1 through 3.

Structure and Relationship of Parts:

Referring to FIG. 1, tool 10 has a shaft 12 with an internal fluid passageway 14 that runs between a first port 16 and a number of second ports 18. It will be understood that there may be more than one first port 16 (as shown in FIG. 3), or more than one second port 18 (as shown in FIG. 1). Ports 16 and 18 are preferably formed in the sidewall of shaft 12, but may also be formed in the end of shaft 12, as shown in FIG. 3. Fluid passageway 14 connects first and second ports 16 and 18 and when open, is intended to permit fluid to pass through, either as tool 10 is descending through liquid, or as liquid is being drained. Accordingly, as will be understood from the discussion below, ports 16 and 18 are preferably close to the operational components of tool 10.

Referring to FIG. 1, tool 10 also has a sealing element, such as a sealing sleeve 20, that seals against a tubular member 22. Sealing sleeve 20 is intended to hold fluid above tool 10 and preferably has a series of cup-shaped sealing elements that collapse against fluid pressure from below, but expand when fluid pressure from above is applied. Fluid passageway 14 acts as a bypass around sealing sleeve 20 when open. In the depicted example, sealing sleeve 20 has an inner cavity 24 through which shaft 12 extends. Shaft 12 moves relative to sealing sleeve 20 between an open position shown in FIG. 2, in which first port 16 is in fluid communication with second port 18, and a closed position shown in FIG. 1, in which sealing sleeve 20 closes first port 16 by positioning first port 16 within inner cavity 24 of sealing sleeve 20. Alternatively, sealing sleeve 20 may be designed to close port 16 directly in the closed position. In the open position shown in FIG. 2, fluid is permitted to bypass sealing sleeve 20, which is useful if there is fluid below tool 10 as it is being inserted into tubular member 22. Referring to FIG. 1, in the embodiment shown, first port 16 is open above sealing sleeve 20 and second ports 18 are open below sealing sleeve 20 when shaft 12 is in the open position. As shown, there are more second ports 18 than first ports 16. This helps keep the tool in the open position when being inserted into tubular member 22. For example, if tool 10 encounters fluid, the fluid will enter ports 18, which will increase the pressure within shaft 12 and at first port 16, which urges tool 10 to remain in the open position. Tool 10 may also be designed to reduce the fluid pressure applied to sealing sleeve 20, such as by using sloped member 33, which may be further reduced in cross-sectional area by being quartered, etc. Once tool 10 is properly positioned, first port 16 is closed by moving shaft 12 down relative to sealing sleeve 20 and opened again by moving shaft 12 up relative to sealing sleeve 20.

Figure 2:
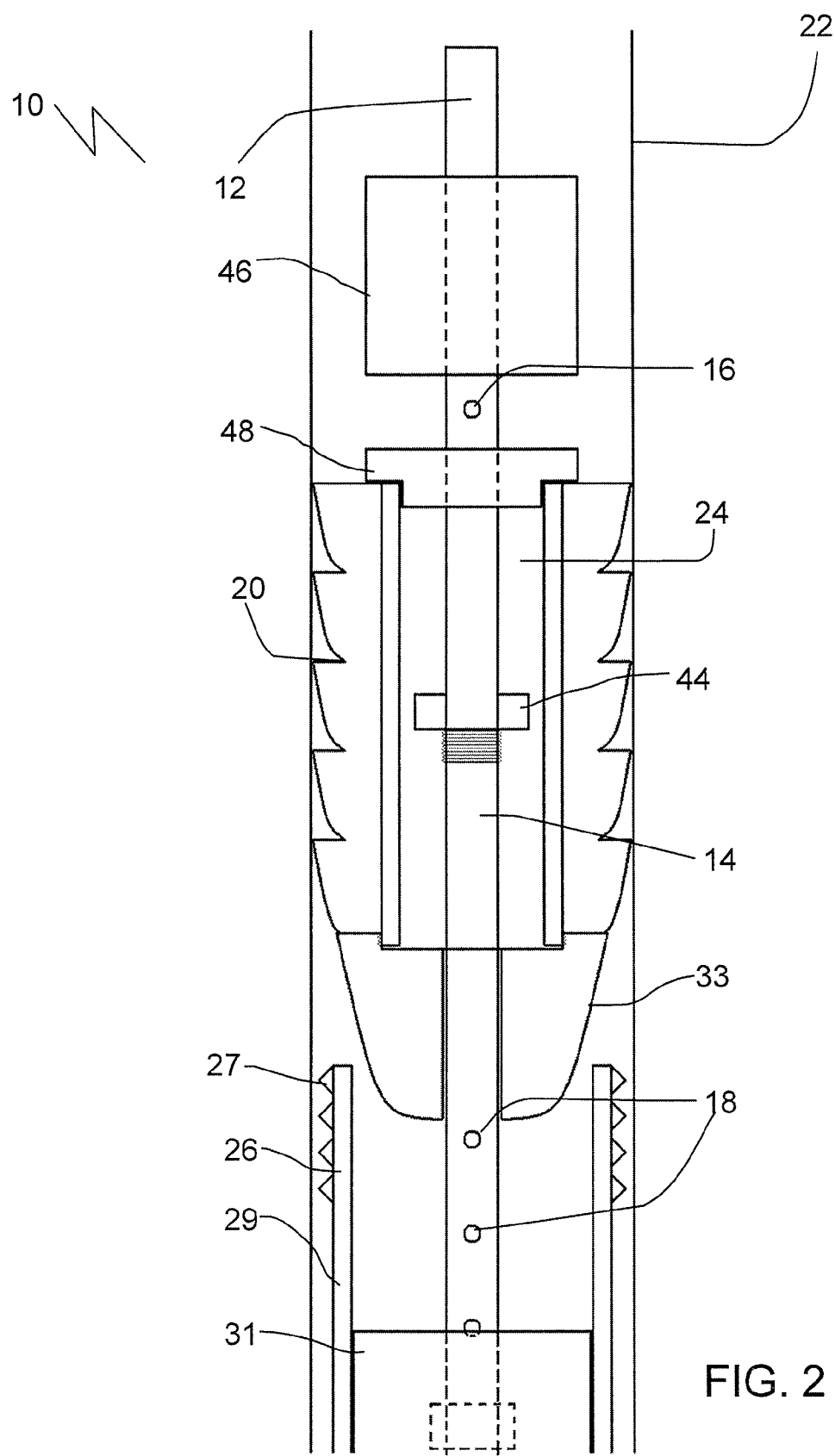
FIG. 2 is a front elevation view, in section of the tool for testing a tubular member in the open position.

Referring to FIGS. 1 and 2, an anchor 26 secures sealing sleeve 20 relative to tubular member 22 to permit shaft 12 to move from the open position to the closed position. As depicted, anchor 26 comprises a set of friction surfaces 27 carried on resilient arms 29 and attached to a block 31. This example is designed to be engaged by a downhole component, such as a pump, that will stop block 31. As the rest of tool 10 travels downward, friction surfaces 27 are pushed outward by a sloped member 33 carried above sleeve 20 that engages friction surfaces 27 and resilient arms 29. In this way, friction surfaces 27 engage tubular member 22, and apply a force to secure sleeve 20 in place. It will be understood that other types of anchors 26 may also be used. For example, there may be an anchor that extends to surface that can be secured by an operator (not shown). The depicted anchor 26 is released by pulling up on shaft 12, which removes sloped member 33 from engagement with resilient arms 29, allowing them to return to their original position. However, before sloped member 33 is disengages, moving shaft 12 up will cause first port 16 to open, allowing fluid to drain, or begin draining. The upward movement of shaft 12 will eventually cause nut 44 to engage stop 48 and move sealing sleeve 20 and sloped member 33 upward. The downward movement of shaft 12 is limited by the engagement of upper stop 46 as it engages stop 48. Nut 44 also may be used to place a limit on how far shaft 12 can move downward.

The movement of shaft 12 may also be controlled by other elements. For example, referring to FIG. 1, an upper stop 46 is positioned at a lower end of shaft 12, which may be welded or threaded on. As mentioned previously, shaft 12 also carries a nut 44, which is used to attach sections of piping together to form shaft 12 during assembly. It will be understood that shaft 12 may also be attached in other ways, and a different stop may be used instead of nut 44. Positioned between upper stop 46 and nut 44 is a stop 48 that is attached to sealing sleeve 20. The upward movement of shaft 12 is limited by contact between stop 48 and nut 44, while the downward movement of shaft 12 is limited by contact between stop 48 on sealing sleeve 20 and upper stop 46 on shaft 12. The example shown in FIGS. 1 and 2 is assembled by attaching upper stop 46 to shaft 12, and inserting shaft 12 through stop 48, which is able to move along shaft 12, with nut 44 below stop 48. Sealing sleeve 20 is then placed over shaft 12 and threaded onto stop 48. A sloped member 33 is attached to sealing sleeve 20 and an upper section of shaft 12 is threaded into nut 44. Anchor 26 is then placed below sloped member 33 on shaft 12. As can be seen, shaft 12, sealing sleeve 20 and anchor 26 are all able to move independently relative to the other components.

Figure 3:
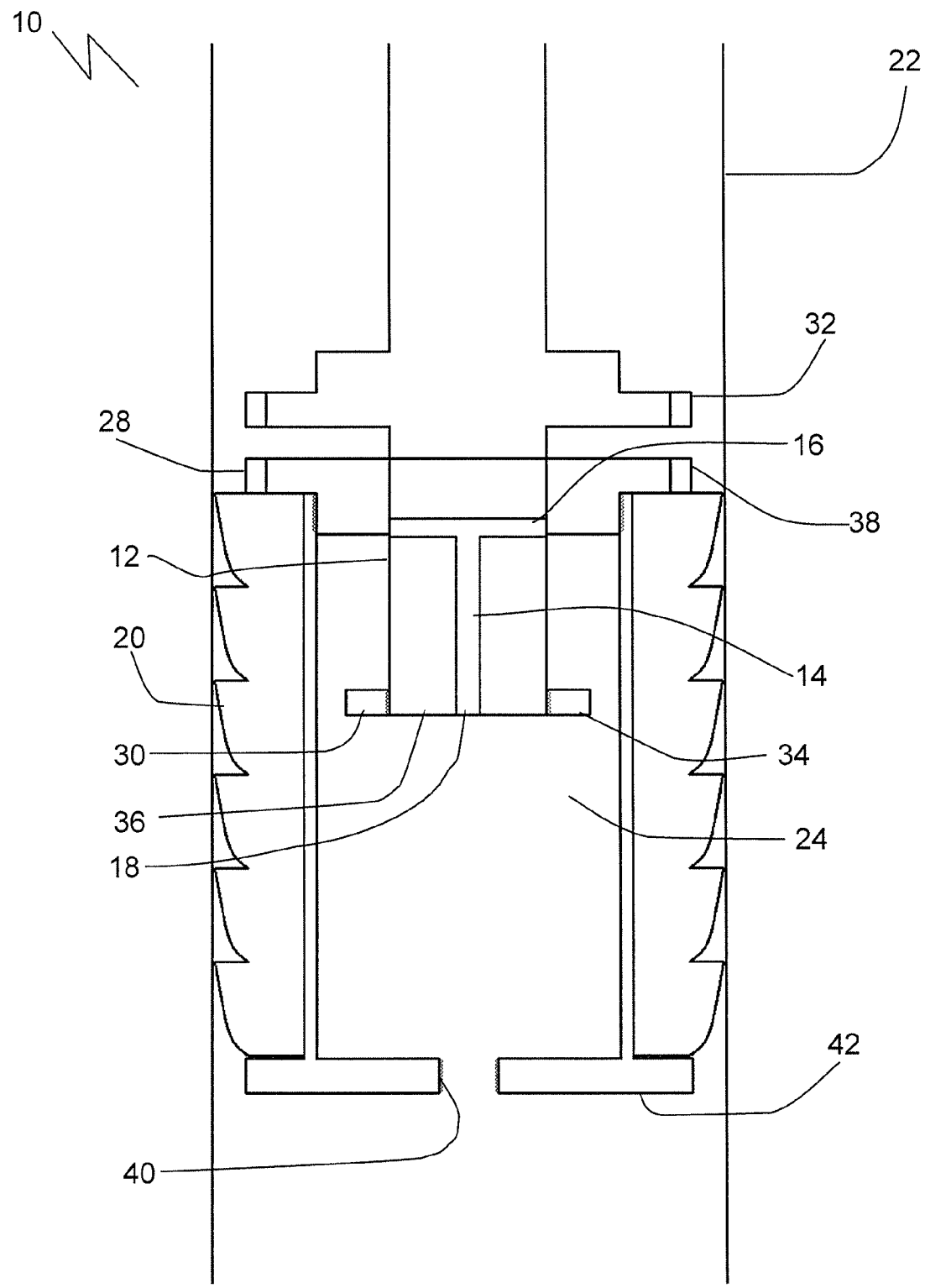
FIG. 3 is a front elevation view, in section, of an alternate version of the tool for testing a tubular member in an intermediate position between the open and closed positions.

Another example is shown in FIG. 3, where inner cavity 24 has a first axial stop 28 surrounding shaft 12 and shaft 12 has a second axial stop 30 within inner cavity 24. Second axial stop 30 engages first axial stop 28 when shaft 12 is in the open position. Shaft 12 has a third axial stop 32 outside of inner cavity 24 which engages first axial stop 28 when shaft 12 is in the closed position.

The example of tool 10 shown in FIG. 3 is assembled by positioning shaft 12 inside sealing sleeve 20. A nut 34 is positioned over shaft 12, then threaded on to the threaded end 36 of shaft 12. In this manner, shaft 12 is allowed to move axially within sealing sleeve 20, and is retained by nut 34 carried by shaft 12 and a cap nut 38 carried by sealing sleeve 20. Sealing sleeve 20 may have an opening 40 that may be used as a drain or may be threaded to allow a nipple or other tool to help guide the tool 10 as it is inserted into a tubing string.

It will be understood that the assembly and arrangements of components may be varied to achieve the same results. The dimensions may be modified depending on the intended size of tubing to be tested and the preferences of the user.

Referring to FIG. 1, shaft 12 has a fluid passage 14 that is blocked when shaft 12 is retracted within sealing sleeve 20, and provides a fluid passageway 14 through shaft 12 and sealing sleeve 20 when shaft 12 is pulled out from sealing sleeve 20. First fluid port 16 in shaft 12 can be seen in FIG. 2, and the retracted, closed position can be seen in FIG. 1.

An example of the use of the tool 10 will now be given. In the example given, the tool 10 is used to test production tubing connected to a progressive cavity pump that has experienced a reduction in its production flow. It will be understood that the tool 10 may also be used in other similar situations. Referring to FIG. 2, tool 10 is inserted into tubular member 22. It is preferred that tool be inserted in the open position to allow fluid in tubular member 22 to easily flow through tool while tool 10 is being moved downwards. Anchor 26 is set as tool 10 contacts the pump, which allows tool 10 to be closed. Once closed, fluid is pumped into tubular member 22 for a pressure test. If tubular member 22 fills and remains full, it can be presumed that the pump has failed, as there is no apparent failure in tubular member 22. The pump can then be pulled from up from downhole and repaired or replaced.

If, however, tubular member 22 fails to fill properly, one can assume that the pump has not failed, or at least that there is a failure in tubular member 22. In that situation, tubular member 22 can be pulled up until the fluid level in the production tubing is reached, which will be at a failure. That section of tubular member 22 is then repaired or replaced.

Once the testing is complete, the tool 10 is retrieved by pulling upward on shaft 12 to the open position to open fluid passageway 14. This allows the fluid to drain from tubular member 22. Shaft 12 is continued to be pulled up to release anchor 26. Once the fluid has drained, tool 10 can be easily pulled out of tubular member 22. Tool 10 is designed to be opened and retrieved using an overshot tool on a sandline cable as this equipment is commonly available. However, it will be understood that other techniques or equipment may also be used to control and retrieve tool 10.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:
1. A tool for testing a tubular member, comprising:
a shaft having a fluid passageway connecting at least one first port and at least one second port;
a sealing element that seals against the tubular member, the shaft moving relative to the sealing element between an open position in which the at least one first port is in fluid communication with the at least one second port and a closed position in which the sealing element closes the at least one first port; and an anchor that secures the sealing element relative to the tubular member to permit the shaft to move from the open position to the closed position.

2. The tool of claim 1, wherein the anchor is released as the shaft is moved from the closed position to the open position.

3. The tool of claim 1, wherein, in the open position, the at least one first port is open above the sealing element and the at least one second port is open below the sealing element.

4. The tool of claim 1, wherein the sealing element is a sealing sleeve.

5. The tool of claim 1, wherein the sealing element comprises an inner cavity, the shaft extending into the sealing element such that, in the closed position, the at least one first fluid port is positioned within the inner cavity.

6. The tool of claim 5, wherein the cavity comprises a first axial stop surrounding the shaft, and the shaft comprises a second axial stop within the cavity, the second axial stop engaging the first axial stop in the open position.

7. The tool of claim 6, wherein the shaft comprises a third axial stop outside the inner cavity, the third axial stop engaging the first axial stop in the closed position.

8. A method of testing a tubular, comprising the steps of:
providing a tool comprising:
a shaft having a fluid passageway connecting at least one first port and at least one second port;
a sealing element, the shaft moving relative to the sealing element between an open position in which the at least one first port is in fluid communication with the at least one second port and a closed position in which the sealing element closes the at least one first port; and
an anchor that secures the sealing element relative to the tubular member to permit the shaft to move from the open position to the closed position;
positioning the tool in a tubular to be tested with the tool in the closed position and such that the sealing element seals against the tubular;
pumping fluid into the tubular above the tool, the fluid being retained above the tool by the sealing element;
observing to see whether the fluid is retained within the tubular; and
moving the shaft to the open position to allow the fluid to drain from above the tool through the fluid passageway.

9. The method of claim 8, further comprising the step of releasing the anchor by moving the shaft from the closed position to the open position.

10. The method of claim 8, wherein, in the open position, the at least one first port is open above the sealing element and the at least one second port is open below the sealing element.

11. The method of claim 8, wherein the sealing element comprises an inner cavity, the shaft extending into the sealing element such that, in the closed position, the at least one first fluid port is positioned within the inner cavity.

12. The method of claim 11, wherein the cavity comprises a first axial stop surrounding the shaft, and the shaft comprises a second axial stop within the cavity, the second axial stop engaging the first axial stop in the open position.

13. The method of claim 12, wherein the shaft comprises a third axial stop outside the inner cavity, the third axial stop engaging the first axial stop in the closed position.

* * * * *